US011373059B2

(12) United States Patent
Merkle et al.

(10) Patent No.: US 11,373,059 B2
(45) Date of Patent: Jun. 28, 2022

(54) COLOR IMAGE ANALYSIS FOR MAKEUP COLOR PREDICTION MODEL

(71) Applicant: MIME, Inc., Vancouver, WA (US)

(72) Inventors: Christopher Merkle, Miami Beach, FL (US); Jan Allebach, West Lafayette, IN (US); Yafei Mao, Monterey Park, CA (US)

( * ) Notice: Subject to any disclaimer, the term of this patent is extended or adjusted under 35 U.S.C. 154(b) by 0 days.

(21) Appl. No.: 17/383,780

(22) Filed: Jul. 23, 2021

(65) Prior Publication Data

US 2021/0350174 A1  Nov. 11, 2021

(51) Int. Cl.
| | |
|---|---|
| *G06K 9/62* | (2022.01) |
| *G06T 7/90* | (2017.01) |
| *G06T 5/00* | (2006.01) |
| *H04N 1/56* | (2006.01) |
| *G06N 20/00* | (2019.01) |
| *G06N 5/04* | (2006.01) |
| *G06T 11/00* | (2006.01) |

(52) U.S. Cl.
CPC ......... *G06K 9/6255* (2013.01); *G06K 9/6215* (2013.01); *G06N 5/04* (2013.01); *G06N 20/00* (2019.01); *G06T 5/009* (2013.01); *G06T 7/90* (2017.01); *G06T 11/001* (2013.01); *H04N 1/56* (2013.01); *G06T 2207/10024* (2013.01); *G06T 2207/20076* (2013.01); *G06T 2207/20081* (2013.01)

(58) Field of Classification Search
CPC ...... G06K 9/6255; G06K 9/6215; G06N 5/04; G06N 20/00; G06T 5/009; G06T 7/90; G06T 11/001; G06T 2207/10024; G06T 2207/20076; G06T 2207/20081; H04N 1/56
See application file for complete search history.

(56) References Cited

U.S. PATENT DOCUMENTS

| | | | |
|---|---|---|---|
| 2015/0145884 A1* | 5/2015 | Jang ...................... | G09G 5/02 345/603 |
| 2019/0014884 A1* | 1/2019 | Fu ....................... | A45D 44/005 |
| 2020/0410719 A1* | 12/2020 | Borkman ............... | G06T 11/001 |
| 2021/0015240 A1* | 1/2021 | Elfakhri ................ | B44D 3/003 |

* cited by examiner

*Primary Examiner* — Phuoc Tran
(74) *Attorney, Agent, or Firm* — Intellectual Strategies

(57) ABSTRACT

A system generates a prediction model for makeup color matching. The system includes a data storage device and a modeling engine. The data storage device stores a plurality of color sets comprising a skin color set, a makeup color set, and a target color set. The modeling engine is coupled to the data storage device and configured to generate a prediction model and an output color set. The prediction model models generation of the target color set based on inputs from the skin color set and the makeup color set. The output color set approximates the target color set with a predictable accuracy.

18 Claims, 3 Drawing Sheets

COLOR IMAGE ANALYSIS FOR MAKEUP COLOR PREDICTION MODEL

BACKGROUND

Selecting and purchasing makeup online presents several issues. One of these relates to the lack of accuracy with which customers can select makeup colors that are a good match with individual customer's skin tones. This lack of accuracy is complicated by the number of variables that might influence the inaccuracies. For example, the color renderings shown on a computer might be impacted by the brightness levels and calibration of the screen used by the viewer. The color renderings can also be influenced by the lighting and camera conditions used to capture images of the makeup colors. Makeup products may also change color as they dry or oxidize after being placed on the skin and absorbed. Additionally, the application conditions of the makeup in the captured images can impact how the makeup ultimately displays to a viewer. In addition to the image capture and viewing conditions, individual users often have difficulty selecting makeup colors that are perceived as a good match with the customer's skin tone.

While cell phones and other mobile devices have enabled users to easily take pictures and selfies that might be used in a makeup selection process, extracting reliable colors from these images remains a problem. Three main factors would make the objective assessment of color from an image difficult. First, images captured by digital cameras are device-dependent. Different cameras may produce different RGB responses. Second, due to various built-in automatic image processing techniques, such as auto white-balancing and sensor tone mapping, the color of the object in the image can look significantly different from its actual color. The third factor is the imperfect illuminant compensation.

To solve these problems, researchers have developed many color correction algorithms. These algorithms can be generally classified into two-fold: color constancy and image calibration. Color constancy is done by estimating and removing the influence of illuminations. Some popular color constancy algorithms include Gray World and Max RGB. A major limitation of these algorithms is that they strongly rely on assumptions. If some of the assumptions do not hold, then the performance of the light source estimation can be poor, and thus, the corrected results can be unsatisfactory.

Image calibration approaches are less sensitive comparing to the color constancy algorithms. They directly map the device-dependent RGB color values to some standard color values with the help of a calibration target. This mapping can be applied to any camera and makes very few assumptions about the characteristics of the images taken by the camera. Research has been done to establish such a mapping, including a three-dimensional look-up table combined with interpolation and extrapolation, machine learning models, neural networks, and regression-based approaches.

There are also extensive applications relying on the skin color information in an image. For example, an adaptive color constancy algorithm can be used to estimate the scene illumination conditions based on the color in skin regions. Some of these applications use the overall facial color to determine the health condition of the subject in the image. Other applications exist to give users personalized cosmetic recommendations.

Generally speaking, selecting a correct foundation or other makeup shade can be very difficult without testing the product on the skin. This is due to limitations in existing technology for assisting users to match the skin complexion with the foundation shade without the customer having adequate knowledge in color theory.

SUMMARY

Embodiments of a system are described. In one embodiment, the system generates a prediction model for makeup color matching. The system includes a data storage device and a modeling engine. The data storage device stores a plurality of color sets comprising a skin color set, a makeup color set, and a target color set. The modeling engine is coupled to the data storage device and configured to generate a prediction model and an output color set. The prediction model models generation of the target color set based on inputs from the skin color set and the makeup color set. The output color set approximates the target color set with a predictable accuracy. Other embodiments of the system are also described.

Embodiments of a method are also described. In one embodiment, the method is a method for generating a prediction model for makeup color matching. The method includes storing a skin color set on a data storage device. The skin color set includes skin color data representative of a skin color of a subject. The method also includes storing a makeup color set on the data storage device. The makeup color set includes makeup color data representative of a standardized makeup application. The method also includes storing a target color set on the data storage device. The target color set includes target color data representative of a makeup application on the subject. The method also includes generating a prediction model to model generation of the target color set based on inputs from the skin color set and the makeup color set. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 4 depicts a flow chart diagram of one embodiment of method for creating color sets.

FIG. 5 depicts a flow chart diagram of one embodiment of method for generating a prediction model for makeup color matching.

Throughout the description, similar reference numbers may be used to identify similar elements. The following list is an example of the reference numbers used in the accompanying drawings:

Figure 1:
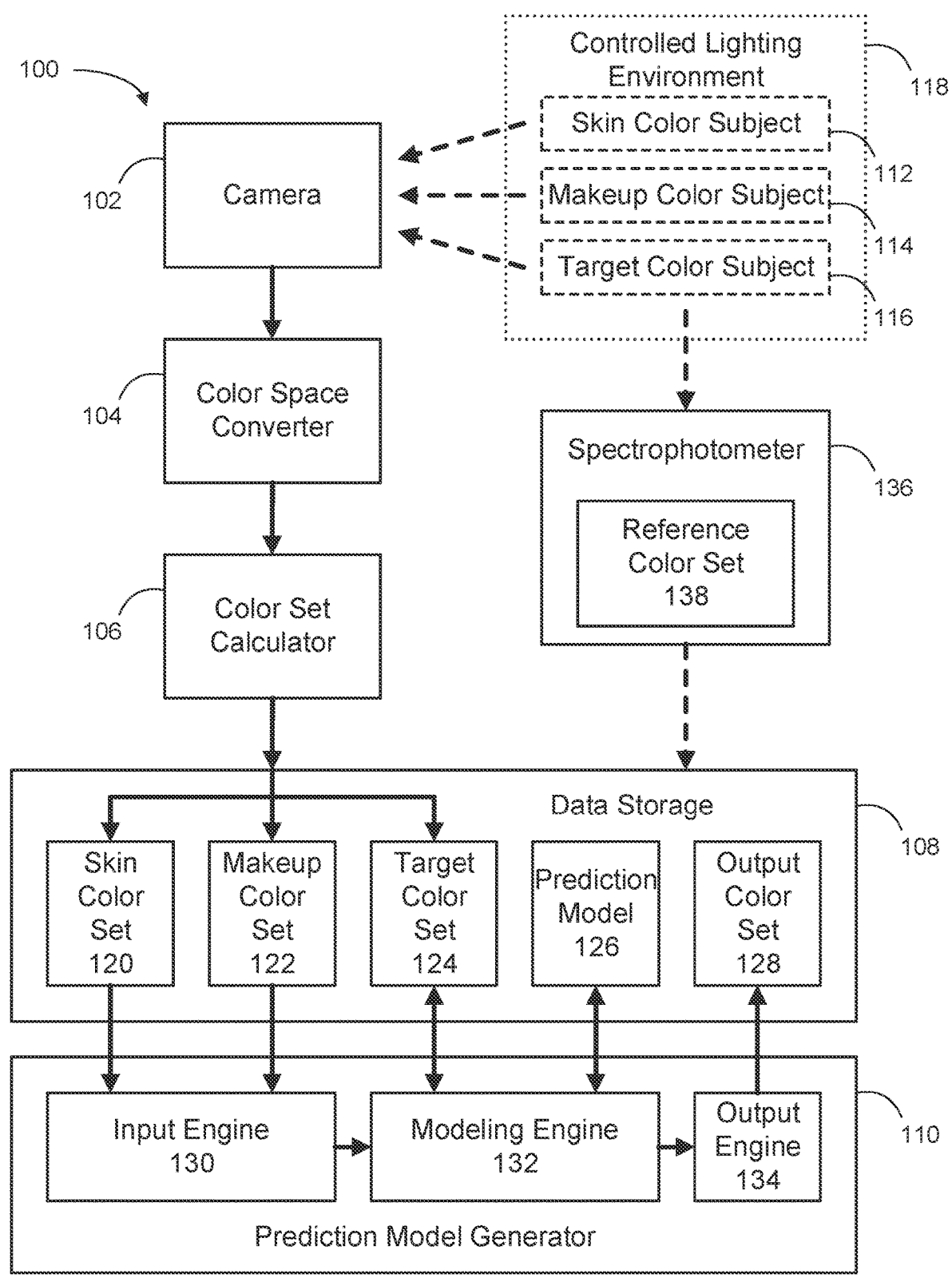
FIG. 1 depicts a schematic diagram of one embodiment of a system to generate a prediction model for makeup color matching.

| Reference # | Designation |
|---|---|
| 10 | Networked System |
| 12 | Computing System |
| 14 | Processing Unit |
| 16 | Communication Bus |

-continued

| Reference # | Designation |
|---|---|
| 18 | Input/Output Interface(s) |
| 20 | Network Adapter(s) |
| 22 | System Memory |
| 24 | Memory |
| 26 | Cache |
| 28 | Data Storage |
| 30 | Display |
| 32 | External Device(s) |
| 100 | Prediction Model System |
| 102 | Camera |
| 104 | Color Space Converter |
| 106 | Color Set Calculator |
| 108 | Data Storage Device |
| 110 | Prediction Model Generator |
| 112 | Skin Color Subject |
| 114 | Makeup Color Subject |
| 116 | Target Color Subject |
| 118 | Controlled Lighting Environment |
| 120 | Skin Color Set |
| 122 | Makeup Color Set |
| 124 | Target Color Set |
| 126 | Prediction Model |
| 128 | Output Color Set |
| 130 | Input Engine |
| 132 | Modeling Engine |
| 134 | Output Engine |
| 136 | Spectrophotometer |
| 138 | Reference Color Set |

DETAILED DESCRIPTION

While many embodiments are described herein, at least some of the described embodiments facilitate generation of a prediction model for predicting and recommending color matches or blends for color surfaces. In one embodiment, the embodiments may generate a prediction model for makeup based on a user's skin tone and, additionally, one or more characteristics of the makeup. Although makeup applications are used as examples within this specification, other applications involving color predictions may benefit from some or all of the techniques described. For example, aspects of the systems and methods described herein may be applied to paint applications, especially where a colored paint is applied to another underlying, colored paint or surface.

Aspects of the systems and methods described in this specification focus on generation of a prediction model. However, other aspects of the overall color application processes also may be addressed in some detail. For example, some aspects of obtaining and classifying data about the underlying tones on which the new colors will be applied may be addressed. Additionally, aspects of specific recommendation algorithms or processes may be addressed. These additional steps or processes may, in some embodiments, be implemented with reliance on the specific prediction model generation details described herein. Other embodiments may be implemented with other types of prediction models and prediction model generation details.

In some embodiments herein, an image analysis tool predicts the perceived visualization of makeup such as facial foundation applied to one or more skin tones based on the prediction model. The prediction model may be derived, at least in part, from color information retrieved from calibrated images of subjects and other calibration tools. In some embodiments, controlled lighting conditions are used to avoid illuminance inconsistencies across multiple images of the same subject. In other embodiments, lighting conditions may vary, and prediction models account for actual or approximated differences in such conditions.

In general, a prediction model can be generated through a series of steps or processes. In one embodiment, reference images are obtained of a user with and without makeup applied. The images include, or are correlated with, a reference target such as a color checker. The color checker may be included in the original images or obtained separately under the same illumination conditions. Relying on the XYZ values (according to the International Commission on Illumination (CIE)) of the reference values on patches of the color checker, a mapping is created from a camera-dependent RGB space to a standard CIE XYZ space.

This type of mapping may be accomplished, in some embodiments, by a set of transformation matrices computed from data extracted from the input images. The data may be computed according to a polynomial regression algorithm or other type of data processing algorithm. After obtaining the transformation matrices, all or part of an input image can be converted to the CIE XYZ space. Then, the CIE L*a*b* color coordinates of the skin pixels, foundation pixels, and the skin-with-foundation pixels are extracted. In some embodiments, a linear regression model and a support vector regression (SVR) model are trained using these color coordinates. Other embodiments may use other machine learning methods, such as random forest regression, the K-means algorithm, and so forth.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Reference to a computer readable medium may take any physical form capable of storing machine-readable instructions, at least for a time in a non-transient state, on a digital processing apparatus. A computer readable medium may be embodied by flash memory, integrated circuits, a compact disk, digital-video disk, a Blu-ray disc, a magnetic tape, a Bernoulli drive, a magnetic disk, or other digital processing apparatus memory device.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

FIG. 1 depicts a schematic diagram of one embodiment of a system 100 to generate a prediction model for makeup color matching. The illustrated prediction model system 100 includes a camera 102, a color space converter 104, and a color set calculator 106. The illustrated prediction model system 100 also includes a data storage device 108 and a prediction model generator 110. Although the prediction model system 100 is shown and described with certain components and functionality, other embodiments of the prediction model system 100 may include fewer or more components to implement less or more functionality.

In one embodiment, the camera 102 is used to capture images that can be used as inputs, or to derive data as inputs, to the prediction model generator 110. Several types of data may be collected in a controlled environment for use ultimately in generating a prediction model.

For example, the camera 102 may capture images of skin color subjects 112, or people without makeup applied to their skin. The data from skin color subjects 112 can be used, in some form, by the prediction model generator 110 as input to generate the prediction model.

As another example, the camera 102 may capture images of makeup color subjects 114. The makeup color subjects 114 include smudges or swatches, or individual applications of makeup applied to a neutral background such as a white paper or board. Multiple images of the makeup color subjects 114 may be obtained at different application thicknesses, viscosities, and/or states of wetness/dryness over a pre-defined time.

As another example, the camera 102 may capture images of target color subjects 116, or pictures of people with makeup applied to their skin. The people that are the target color subjects 116 may be the same people as the skin color subjects 112. Also, the images of the target color subjects 116 may include multiple images of the same person with different makeup colors that are visually perceived by the person to be close to the person's skin tone. The data from the target color subjects 116 can be used, in some form, by the prediction model generator 110 as input to generate the prediction model.

As another example, the camera 102 may capture images of at least a portion of a color checker with various colors approximating skin tones and gray values. These images may be obtained in the same frames as the skin color subjects 112, the makeup color subjects 114, or the target color subjects 116. Alternatively, these images may be obtained independently of other subjects, although in similar lighting conditions, or a controlled lighting environment 118, as the other images. The data from the color checker images can be used, in some form, by the prediction model generator 110 as input to generate the prediction model.

In other embodiments, the camera 102 may capture other types of images for data extraction and use in the prediction model generation process.

The images captured by the camera 102 are then processed in a number of ways to extract or generate data to characterize features of the images. In general, each image may be processed to identify features, balance luminance and white balance, and extract colors from the images. For skin color subjects 112, the image processing is focused on identifying and characterizing primary skin colors. Similarly, for target color subjects 116, the image processing focuses on identifying and characterizing applied makeup colors on skin. The image processing for the makeup color subjects 114 focuses on characterizing makeup applied in a standardized way to a neutral background, without being applied to a user's skin.

A specific aspect of the image processing involves converting image data from one color space to another. In one embodiment, the color space converter 104 is configured to assist with color space conversions. For example, image data may be obtained in an RGB color space and later converted to a CIE XYZ color space. Also, image data in the CIE XYZ color space may be converted to a CIE L*a*b* color space. These types of conversions may occur on all of the data within an image or on a subset of the image data. In other embodiments, other color spaces or conversion sequences may be implemented.

Ultimately, one or more color sets are provided to the prediction model generator 110 so a prediction model can be generated based on the input color sets. In one embodiment, the color set calculator 106 facilitates creation of specific color sets. The color sets may be created from a single image, a portion of an image, or multiple images.

Although the color set calculator 106 is shown downstream from the color space converter 104, there is no limitation on physical layout or the order of operations or functions that can be performed by these component modules (or any other components) within the prediction model system 100. Additionally, in some embodiments, data may transfer back and forth between the color space converter 104 and the color set calculator 106, or their respective modular implementations, in order to perform a combination of conversion and calculations to accomplish the image processing for specific color sets.

In one embodiment, the color sets are stored in the data storage device 108. The data storage device 108 may be any type of persistent storage or memory device coupled to a computer processing device for manipulating the data.

For example, the data storage 108 may store a skin color set 120 including data derived from the image(s) of the skin color subject 112. Similarly, the data storage 108 may store a makeup color set 122 including data derived from the image(s) of the makeup color subject 114. Also, the data storage 108 may store a target color set 124 including data derived from the image(s) of the target color subject 116. The specific formats and data stored within each of these data sets may vary, along with the color space in which the data sets are expressed.

In one embodiment, the prediction model generator 110 includes an input engine 130 to receive or retrieve data from the data storage 108 in order to pass such input data to a modeling engine 132. The modeling engine 132 is configured to use the input data and generate a prediction model 126 that may be used, for example, to approximate the target color set 124 based on a combination of the skin color set 120 and the makeup color set 122. In other words, the prediction model 126 is configured to devise an algorithm to model creation of the target color set 124 from both the skin color set 120 and the makeup color set 122. In order to accomplish this, the modeling engine 132 may receive the skin color set 120 and the makeup color set 122 as inputs, then reference the target color set 124 in order to create the prediction model 126.

In one embodiment, an output engine 134 is coupled to the modeling engine 132 to output store one or more output color sets 128 in the data storage device 108 based on the same or different inputs to the prediction model generator 110. In one embodiment, the output color set 128 is the resulting color set generated according to the prediction model 126 for a specific combination of input color sets. When the prediction model 126 is used in an operating mode, the output color set 128 is generated for use in predicting color combinations and generating color recommendations, such as makeup recommendations, for a specific user.

When the prediction model 126 is used in a training mode, the modeling engine 132 may retrieve a reference color set 138 from a spectrophotometer 136 (for example, via the data storage device 108) in order to compare it against the target color set 124 and/or the output color set 128. In one embodiment, by calculating an error offset, or distance, between the data in the output color set 128 and the data in the reference color set 138, the accuracy of the prediction model 126 can be evaluated.

The foregoing description provides an overview of various components and functions of the prediction model system 100. Additionally, the further examples below illustrate specific implementations of the same and supplemental functions that may be achieved by embodiments of the prediction model system 100.

Some embodiments of the prediction model system 100 facilitate a method to predict makeup foundation colors when blended onto human skin. The prediction is based upon the color coordinates of the skin and of the foundation shade that are retrieved from images, which may be taken by the user. To ensure color accuracy, these images are calibrated with the help of a color checker. In one embodiment, the image data in the RGB space is partitioned into three parts, and three different transformation matrices are designed, with each transformation matrix corresponding to one of the partitions. This allows the RGB values of the color checker patches to be mapped to reference values with minimal error. Experimental results show that the proposed calibration method works well on many datasets. In other embodiments, other nonlinear mappings are also possible for implementing this transformation.

A prediction model can be developed that takes the color coordinates of the skin and the foundation as inputs and then outputs those of a modeled color to anticipate the combined foundation and skin application. Such prediction model may be implemented using linear regression or support vector regression (SVR) models, although other embodiments may use other algorithms.

In some embodiments, the data from images that are collected are eventually calibrated as part of the prediction model generation process. Image calibration relies on a standard calibration target. In some embodiments, a color checker serves as the standard calibration target. An example of a color checker is the X-RITE COLORCHECKER Digital SG 140 color checker, which may be used as a reference calibration target. In other embodiments, other types of color checkers may be used. In one example, the color checker contains 14 unique skin tone colors, which will be helpful for calibrating the skin complexions. Subjects from diverse ethnicities may be imaged ensure the inclusion of all possible types of skin tones (fair, light, medium, tan, and dark). And a standard procedure for data collection may be used to help avoid potential processing errors.

In one embodiment, images of the skin color subject may be obtained when no foundation or other makeup is applied. Subsequently, images of the target color subject may be obtained for each of several foundation shades that are applied to the subject's skin. For example, images obtained for 3-4 different applied foundation shades may be sufficient, although other embodiments may rely on another number of images and/or foundation shades.

In one embodiment, the subject uses foundation shades that are close to their actual skin tone by testing each possible match on their skin. This may be done by evenly applying the foundation on the skin using a new and clean sponge. Since the moisture level in the foundation affects its perceived color characteristics, images may be taken at different intervals as the foundation dries. By repeating these application and imaging steps, several different images may be obtained to populate various target color sets.

For purposes of generating the prediction model, these steps may be conducted under controlled lighting in a lab with lamps having known color temperatures and diffuse lighting to create a consistent illumination environment. In some embodiments, the color checker is also imaged together with each of the subjects in order to create a standard reference for each of the images. Alternatively, the color checker may be captured in separate images, as long as the lighting conditions are consistently controlled.

In some cases, a successful prediction relies on retrieving accurate color information from the images and developing an effective model that ties the color information across different images. This type of image calibration procedure allows the subsequent generation of an accurate prediction model. This may begin with a skin pixel detection algorithm to identify the skin pixels within an image. Then device-dependent RGB values can be converted into another useful color space so that the color differences between measured and modeled data sets can be evaluated.

For the images that include the subject's skin, either with or without the foundation applied, the skin pixels in the images are detected and isolated from the non-skin pixels. An algorithm for skin detection may be implemented.

In one example, a fast and efficient RGB-H-CbCr model is adopted. The skin detection model may utilize one or more criteria for identifying a skin pixel. In one embodiment, under uniform illumination conditions, skin pixels may be filtered using the following criteria. First, the RGB values fall within a specific range of absolute and relative values. Second, the red and blue chrominance values satisfy relative value conditions. Third, hue values are within specified ranges. The model for skin detection does not necessarily need to be completely accurate, as long as accuracy is within an acceptable range. The resulting detected pixels create a skin segmentation mask, even across various skin tones and complexions. In other embodiments, other approaches to detecting skin colors may be used.

After the skin pixels are detected, image calibration converts the device-dependent RGB values into the CIE XYZ values. In one embodiment, a two-stage process utilizes gray balancing and polynomial regression to rectify the colors of interest, based on images that capture the color checker in the same frame as each of the subjects. In alternative implementations where the color checker is captured in different images, additional processing will be required to correlate those images to the subject images.

To be able to calibrate the colors, the values of the color patches in the original image and their corresponding ground truth (i.e., measured) values are obtained. This may be done for some or all of the available color patches on the color checker. However, in one embodiment, only a subset of color patches is utilized based on the visual relationship of the patches to common skin colors. In a further embodiment, the reference CIE XYZ values of the target color patches can be measured with a spectrophotometer under a standardized illuminant (e.g., D50 illuminant), and these values may be stored as a separate measured color set.

Next, the RGB values of the identified patches in the image are extracted through an automated process. This may be done by locating the spatial centroid of each patch and then computing the average RGB values over the center region of the patch. In other embodiments, other models for RGB value extraction may be used.

Using the image RGB and reference CIE XYZ value pairs, gray balancing can be performed. Gray balancing is helpful to avoid having a dominant hue in the image. In one embodiment, neutral gray patches on the color checker are used for gray balancing. For example, twelve neutral gray patches may be used. In other examples, another number of neutral gray patches may be used.

The linear RGB values of each patch and the CIE Y (i.e., luminance) value of the neutral gray patches are related to one another. This results in, for example, twelve pairs of linear RGB and CIE luminance values for each image of the subject. These data pairs may be used to train a Gain-Gamma-Offset model.

After obtaining the linearized RGB values, the regression step can be initiated. To maximize the calibration accuracy, the target patches are classified into three sets (designated as Set 1, Set 2, and Set 3), and the calibration mapping is trained separately on each set. In other embodiments, a different number of sets may be used.

To form Set 1, the mean RGB values of the pixels within the skin segmentation mask are computed. This is referred to as the centroid of Set 1. Then, the patches centered around the centroid of Set 1 are identified based on pixels having a Euclidean distance of less than 80 to the centroid of Set 1 (or another threshold may be used, instead of 80). Similarly, the patches in Set 2 and 3 are grouped based on the centroids determined by a K-means algorithm. The centroids of these three training sets will be used again when classifying image pixels for the entire image. Polynomial regression can then be used to train three different transformation matrices.

In some cases, polynomial regression is not able to map all colors correctly. This is because it can only minimize the sum of squared residuals. Also, it has no control over the error distribution. However, it is possible to prioritize the skin-tone related colors compared to other colors in the image. Therefore, in some embodiments polynomial regression is only applied on a limited gamut of colors. The colors outside of the gamut may significantly deviate from the actual color and may appear different in different images. According to experiments, ignoring some non-skin and/or highly saturated colors in the color checker will lead to a smaller mean calibration error. Thus, it is possible to use only a subset (e.g., 35 patches) as the target training patches from the color checker.

Subsequently, the transformation matrices can be applied to the entire image. For example, the image pixels are classified into three sets based on the three precomputed centroids, and then the linearized RGB values are converted to CIE XYZ using the corresponding matrices. In other embodiments, another number of sets may be used.

In order to evaluate the accuracy of the calibration results, the difference can be measured between the calibrated XYZ values obtained from the transformation matrices and the corresponding reference XYZ values of the color patches obtained using a spectrophotometer. To better perceive the color coordinates, in some embodiments they are converted from CIE XYZ to CIE L*a*b* space.

The color difference between the calibrated CIE L*a*b* coordinates and the ground truth measured values of each of the patches is computed. Experimental results measuring 35 patches found that 33 patches have an acceptable difference (e.g., less than 3), which indicates that color correction is quite effective for these test images. In other experiments, the mean calibration error for the majority of the images is too small to be noticed (i.e., $\Delta E76$ is equal to or less than 1, although other color difference metrics such as $\Delta E2000$ may be used). This suggests that the calibration algorithm works well on many datasets.

Apart from the photos of the subjects, an image that contains the swatches of all the foundation shades is also collected as the makeup color subject. In one embodiment, the foundation shades are applied on a plain white paper or canvas using makeup sponges or another applicator. The swatches are then photographed with the color checker under the same lab settings as are used for the skin color subject and the target color subjects. The same color correction procedure is performed on the image, except that the three sets are now all determined by K-means. In one calculation, the mean calibration $\Delta E76$ of this foundation swatches image is 0.34, which is considered accurate because it is below and example threshold of 1.

In further embodiments, images may be obtained while the foundation is wet after it is first applied. Additionally, images may be obtained at different stages of the drying process. It's also possible to measure the color distance of wet and dry states of the foundation. In some embodiments, these color distances may be used when the prediction model 126 generates user makeup recommendations. In general, further distances are indicative of poorer matches.

Using the experimental results obtained, a prediction model is developed that can predict the CIE L*a*b* coordinates of the skin-with-foundation color (i.e., the output color set) based on inputs using data from the CIE L*a*b* coordinates of a skin-with-no-foundation color (i.e., the skin color set) and a foundation color (i.e., the makeup color set). In one embodiment, the prediction model may be derived using linear regression. In other embodiment, the prediction model may be derived using SVR with a linear kernel. Other types of models also may be used such as random forest or gradient boost.

In summary, the prediction model 126 is created based on a series of steps utilizing the skin color set 120, the makeup color set 122, and the target color set 124. The prediction model 126 can also be validated by comparing the target color set 124 to measured reference values. Each of these images may be calibrated using a subset of patches from a color checker. After detecting the skin pixels and classifying them into a number of sets according to the Euclidean distance from the RGB values of each pixel to corresponding centroids, three different transformation matrices are computed separately and then applied to the corresponding pixels in the image. The calibration accuracy is measured by the color difference $\Delta E$ between the calibrated value in CIE L*a*b* space and the measured reference value. The $\Delta E$ results from test experiments indicate that the error produced by the proposed method is almost indistinguishable for most of the images. The prediction model is then built upon the calibrated selfie images. The prediction performance, as measured by the coefficient of determination (R squared), mean squared error (MSE), and mean absolute error (MEA). Additionally, leave-one-out cross-validation (LOOCV) results show that the prediction made by both linear regression and SVR with a linear kernel is reliable.

Figure 2:
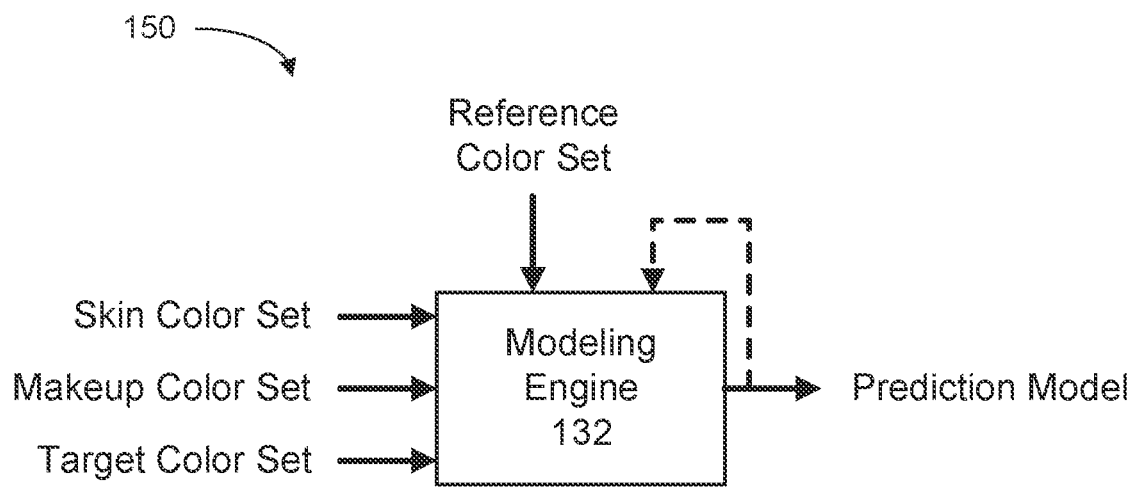
FIG. 2 depicts a schematic diagram of a model generation process for the modeling engine of FIG. 1.

FIG. 2 depicts a schematic diagram of a model generation process 150 for the modeling engine 132 of FIG. 1. In general, the modeling engine 132 is configured to generate prediction models for various types of color products such as makeup. For makeup, the modeling engine 132 receives data inputs including a skin color set, a makeup color set, and a target color set. For other types of color products, different types of data sets may be used.

The modeling engine creates a prediction model to approximate the target color set based on the skin color set and the makeup color set. In some embodiments, the accuracy of the prediction model can be improved by understanding a difference between the target color set derived from images and a reference color set of measured color values. Alternatively, separate reference color sets may be measured for correlation with the skin color set and/or the makeup color set. In these embodiments, understanding the level of error, if any, between the color sets derived from images and the reference color set derived from color measurements can influence how the prediction model is created to minimize or otherwise alter how the resulting prediction model ultimately generates output color sets.

In other embodiments, the reference color set may be compared with an output color set from the prediction model in order to understand the absolute error measurement between the output color set and the reference color set. Further, the level of calculated error in the output color set may be fed back into the modeling engine 132 in order to fine tune the generated prediction model.

Figure 3:
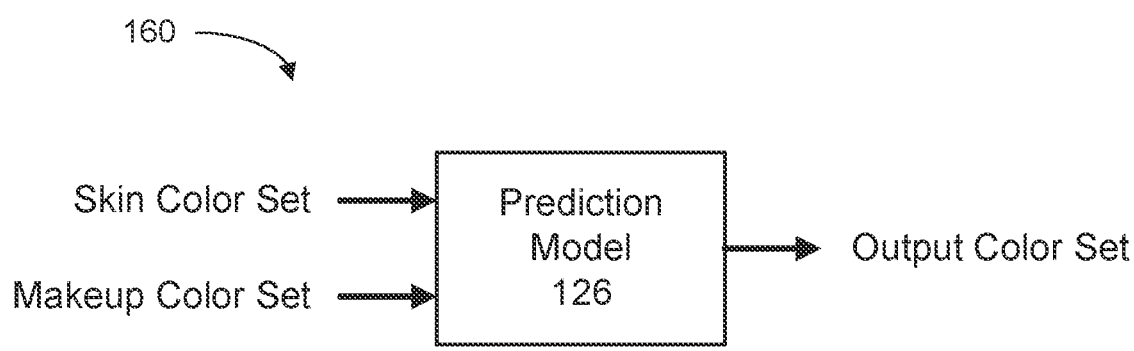
FIG. 3 depicts a schematic diagram of a prediction model process for the prediction model of FIG. 1.

FIG. 3 depicts a schematic diagram of a prediction model process 160 for the prediction model 126 of FIG. 1. After the prediction model 126 has been generated for a line of color products, the prediction model 126 can be used to generate an output color set based on data inputs including the skin color set and the makeup color set. In this way, the output color set approximates the corresponding target color set with a known level of accuracy.

There are many possible applications of this type of technology. Within the area of makeup and personal products, embodiments of the systems and processes described herein may be applied to various skin products such as foundation, concealer, lipstick, eye shadow, bronzer, spray tanner, tinted moisturizer, lip gloss, blush, and other skin products. In addition to skin products, some embodiments may be applied to other person products such as nail polish, hair dye, and contact lenses.

In addition to makeup applications, in other embodiments aspects of the processing described herein can be used to synthesize skin tones which are impacted by cosmetic and/or medical procedures. For example, a user may be able to synthesize the coloring effects of a chemical peel procedure to evaluate redness resulting from the procedure. In another example, a user may be able to synthesize coloring changes before and after treatments for dark circles under the user's eyes. In another example, a user may be able to predict color changes to hair due to a hair coloring application or another hair condition treatment. In another example, a user may be able to synthesize coloring changes resulting from treatment or removal of skin features such as moles or skin cancer. In another example, a user may be able to synthesize skin coloring and conditions during or after treatment for acne.

Outside of makeup and personal products, there are other potential applications to show how colors might combine upon application and/or fade with exposure over time. These types of applications may warrant additional data collection over longer periods of time. For example, some embodiments may be used to predict how a tattoo might overlay on a person's skin and/or fade with time. In another example, some embodiments may be used with paints, stains, oils, and other surface finishes for both application and fading predictions.

In each of these examples, embodiments described herein can create a more realistic representation of skin coloring and conditions than the simplistic addition of color layers with a level of transparency on top of a user's image. The use of analyzed, calibrated, and balanced color processing help to visualize color changes with increased accuracy, regardless of whether the changes are related to skin tone brightness, correction, or averaging.

Figure 4:
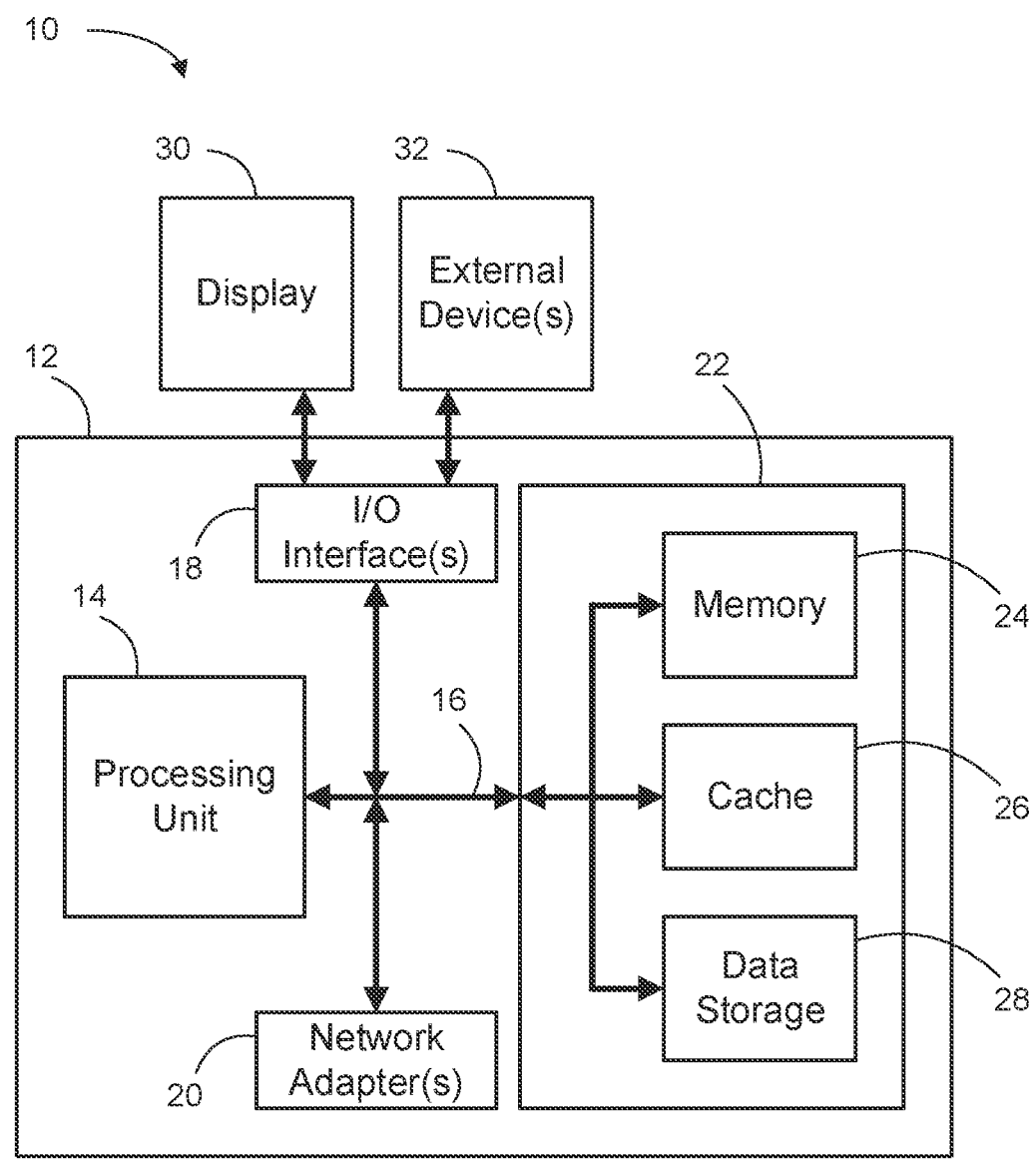
FIG. 4 depicts a schematic diagram of one embodiment of a computing device for implementing functions of the system of FIG. 1.

FIG. 4 depicts a schematic diagram of one embodiment of a computing device for implementing functions of the system 100 of FIG. 1. In some embodiments, aspects of the prediction model system 100 are implemented via a networked system 10 and, more specifically, a computer system 10 or its component parts. For instance, conversions and calculations described herein may be implemented in the computer system 12 or its component parts.

The illustrated computer system 12 may include, but is not limited to, one or more processing arrangements, for example including processors or processing units 14, a communication bus 16, one or more input/output (I/O) adapters 18, one or more network adapters 20, and a system memory 22.

In one embodiment, the system memory 22 includes computer system readable media in the form of volatile memory, such as random-access memory (RAM) 24 and/or cache memory 26. The system memory 22 may further include other removable/non-removable, volatile/non-volatile computer system storage media. In such instances, each can be connected to the bus 16 by one or more data media interfaces. The memory 22 may include at least one program product having a set (e.g., at least one) of program modules that are configured to carry out the functions of proposed embodiments. For instance, the memory 22 may include a computer program product having program executable by the processing unit 14 to perform a method capturing, storing, and manipulating color data within the context of a prediction model. Programs and/or utilities having a set (at least one) of program modules may be stored in the memory 22. Program modules generally carry out the functions and/or methodologies described herein.

The computer system 12 may also communicate with one or more external devices such as a keyboard, a pointing device, a display 30, or other external devices 32. Also, the computer system 12 can communicate with one or more networks such as a local area network (LAN), a general wide area network (WAN), and/or a public network (e.g., the Internet) via network adapter 20.

In the context of the present application, where embodiments of the present invention constitute a method, it should be understood that such a method is a process for execution by a computer, i.e. is a computer-implementable method. The steps of the method therefore reflect various parts of a computer program, e.g., parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, an embedded system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages such as MatLab or Python. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions such as application specific integrated circuits (ASICs) or other hardware described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system to generate a prediction model for makeup color matching, the system comprising:
    a data storage device to store a plurality of color sets comprising a skin color set, a makeup color set, and a target color set; and
    a modeling engine coupled to the data storage device, the modeling engine configured to:
        generate a prediction model to model generation of the target color set based on inputs from the skin color set and the makeup color set; and
        generate an output color set according to the prediction model based on the inputs from the skin color set and the makeup color set;
        apply a white balance normalization function to data within the skin color set, the makeup color set, and the target color set;
        apply a polynomial regression algorithm to identify the prediction model; and
        check a color distance between an output color set from the prediction model relative to a measured reference color set.

2. The system of claim 1, wherein the data storage device is further configured to store skin color data representative of a skin color of a subject as the skin color set.

3. The system of claim 1, wherein the data storage device is further configured to store makeup color data representative of a standardized makeup application as the makeup color set.

4. The system of claim 1, wherein the data storage device is further configured to store target color data representative of a makeup application on the subject as the target color set.

5. The system of claim 1, wherein the modeling engine is further configured to generate the prediction model in a training mode based on minimizing a color distance factor between corresponding datasets from the target color set and a reference color set.

6. The system of claim 1, wherein the modeling engine is further configured to generate the prediction model in a training mode based on minimizing a color distance factor between corresponding datasets from the output color set and a reference color set.

7. The system of claim 1, wherein the modeling engine is further configured to utilize the prediction model in an operating mode to generate the output color set based on the inputs from the skin color set and the makeup color set.

8. The system of claim 1, further comprising a color set calculator coupled to the data storage device, the color set calculator to concatenate a plurality of color data sets together as input into the prediction model.

9. The system of claim 8, further comprising a color space converter coupled to the color set calculator, the color space converter configured to convert color data sets from a first color space to a second color space.

10. The system of claim 1, wherein the modeling engine is further configured to process the output color set to display a synthesized visual representation of the output color set applied to skin pixels of a subject user.

11. The system of claim 10, wherein the modeling engine is further configured to display the synthesized visual representation of the output color set to replace skin pixels of the skin color set within a visual framework inclusive of the subject user.

12. A method for generating a prediction model for makeup color matching, the method comprising:
    storing a skin color set on a data storage device, the skin color set comprising skin color data representative of a skin color of a subject;
    storing a makeup color set on the data storage device, the makeup color set comprising makeup color data representative of a standardized makeup application;
    storing a target color set on the data storage device, the target color set comprising target color data representative of a makeup application on the subject; and
    generating a prediction model to model generation of the target color set based on inputs from the skin color set and the makeup color set;
    applying a white balance normalization function to data within the skin color set, the makeup color set, and the target color set;
    applying a polynomial regression algorithm to identify the prediction model; and
    checking a color distance between an output color set from the prediction model relative to a measured reference color set.

13. The method of claim 12, further comprising generating an output color set according to the prediction model based on the inputs from the skin color set and the makeup color set.

14. The method of claim 12, wherein generating the prediction model further comprises, in a training mode, minimizing a color distance factor between corresponding datasets from the target color set and a reference color set.

15. The method of claim 12, wherein generating the prediction model further comprises, in a training mode, minimizing a color distance factor between corresponding datasets from the output color set and a reference color set.

16. The method of claim 12, further comprising converting color data sets from a first color space to a second color space.

17. The method of claim 12, further comprising concatenate a plurality of color data sets together as input into the prediction model.

18. The method of claim 12, further comprising detecting skin colors within the skin color set and the target color set.

* * * * *